Figure 1:
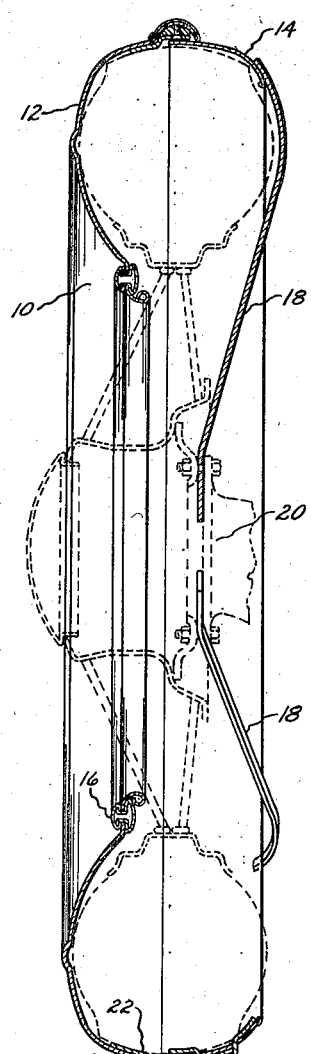

Nov. 24, 1936.　　　F. W. SCHMIDT ET AL　　　2,061,986
TIRE COVER
Filed Dec. 5, 1934　　　3 Sheets-Sheet 1

Inventors
Frank W. Schmidt and
Frederick E. Beach
By Beaman & Langford
Attorney

Nov. 24, 1936. F. W. SCHMIDT ET AL 2,061,986
TIRE COVER
Filed Dec. 5, 1934 3 Sheets-Sheet 2

Inventors
Frank W. Schmidt and
Frederick E. Beach
Beaman & Langford
Attorney

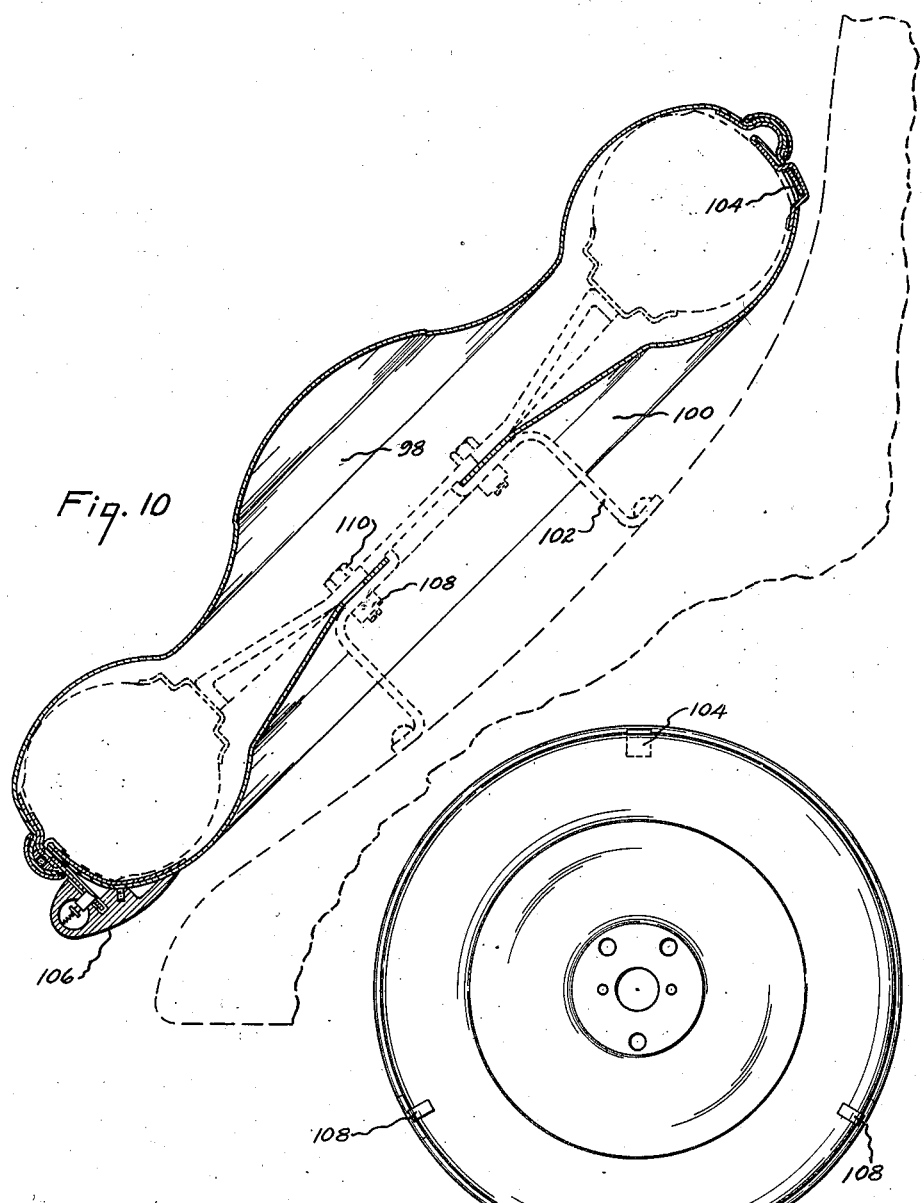

Patented Nov. 24, 1936

2,061,986

UNITED STATES PATENT OFFICE 2,061,986

TIRE COVER

Frank W. Schmidt and Frederick E. Beach, Jackson, Mich., assignors to Ryerson & Haynes, Inc., Jackson, Mich., a corporation of Michigan Application December 5, 1934, Serial No. 756,146

21 Claims. (Cl. 150—54)

The present invention relates to improvements in tire covers or protectors for the spare tire or spare tire and wheel of an automotive vehicle. More particularly, the invention relates to improvement in mechanism for preventing unauthorized removal of tire covers from spare tires and wheels conventionally supported from carriers located at the side or rear of the vehicle; the improvements being especially adaptable to tire covers having the parts thereof resiliently clamped upon the tire walls.

In the so called "trunk" type of tire cover or carrier used for the housing of a spare tire carried upon a demountable rim prior to the advent of the demountable wheel, the parts thereof were not fitted to the tire and no particular difficulties arose preventing the employment of conventional means for locking separable parts together. However, at the present time tire covers are designed primarily to be used in connection with a spare tire and wheel mounted upon a carrier. Such covers are for the most part fabricated from relatively light gauge resilient sheet metal and conform generally to the contour of the tire and wheel. Also, in several of the types of tire covers in extensive commercial use at the present time, the tire is resiliently clamped between separable parts to impart anti-rattle characteristic to the cover and to compensate for variations in tire sizes due to wear and manufacturing tolerances.

To prevent unauthorized removal of the tire cover or a part thereof from the spare wheel and the removal of the spare wheel itself from its carrier, several methods have been heretofore proposed. In cases where the face plate or outer cover section extends to the hub of the wheel and is apertured to receive the hub cap, the hub cap has been provided with locking mechanism to prevent the removal of cap from the hub and the face plate of the tire cover confined thereby. Locking closures have also been used for a similar purpose in tire cover structures in which a part of the cover is detachably supported from within the wheel hub and it is necessary to remove the closure supported in an aperture of such part in order to detach the same from the wheel structure or carrier. In tire cover structures in which the face plate or outer cover portion terminates short of the locality of the wheel hub, various forms of embracing straps and the like have been employed to lock the cover to the spare wheel structure or carrier.

An object of this invention is to produce a metal tire cover of two parts, divided circumferentially of the tire, with improvements in means for separably associating the two parts with the tire.

Another object is to produce a metal tire cover having separable parts collectively housing at least portions of the tread and sides of the tire, with improved means for preventing unauthorized removal of the tire cover or a part thereof from the spare tire and/or the spare tire and/or wheel from its carrier structure.

Another object is to produce a metal tire cover of two parts, one of which is bodily removable from the other, with improved means for detachably associating these parts and preventing unauthorized removal.

A further object is to produce a multi-part tire cover, the face plate of which terminates short of the hub of the spare wheel, with improved locking means to prevent unauthorized removal of a part of the cover from the spare tire and wheel and/or spare tire and wheel from its carrier or the cover.

A still further object is to produce a multipart light gauge sheet metal tire cover of a design to readily receive as an accessory a lock structure preventing unauthorized separation of the parts of the cover.

A still further object is to produce a locking tire cover in which the lock structure constitutes an accessory part of the cover.

Another object is to devise a lock structure for tire covers having the parts thereof clamped upon the tire.

Other objects and advantages will appear in the following description when considered in connection with the accompanying drawings in which—

Figure 2:
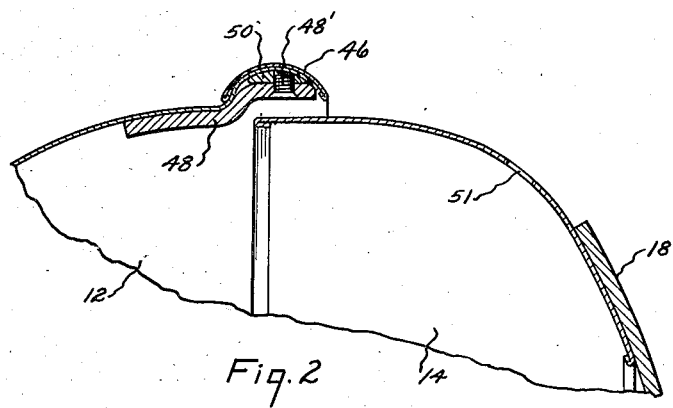
Figure 6:
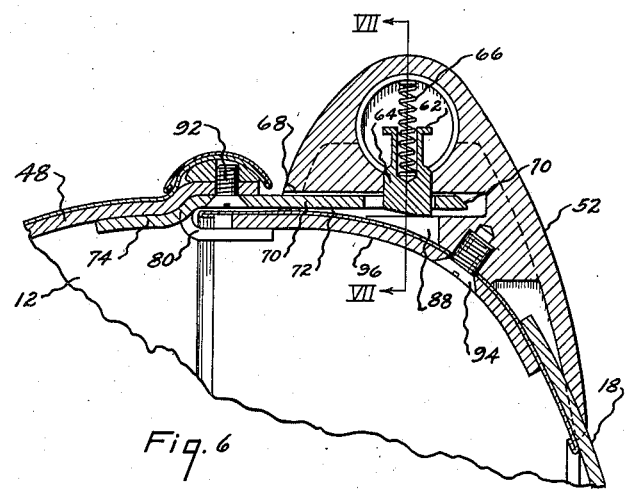
Figures 3, 5:
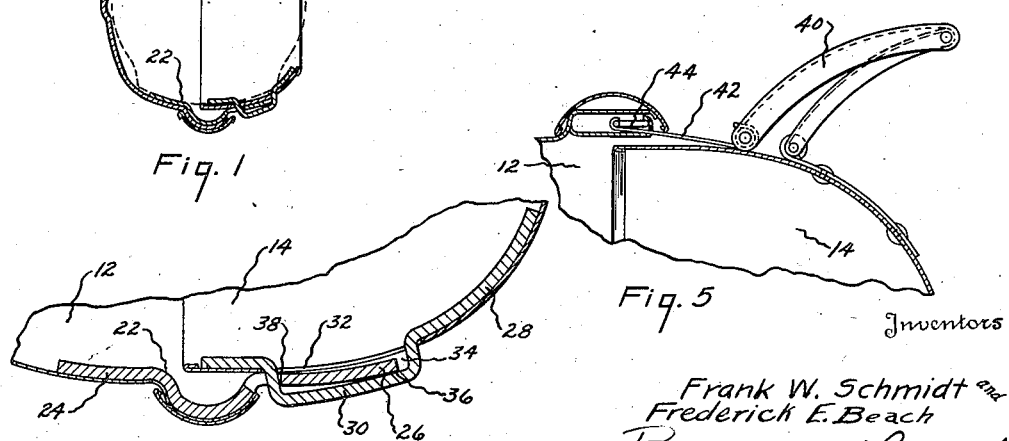
Figure 7:
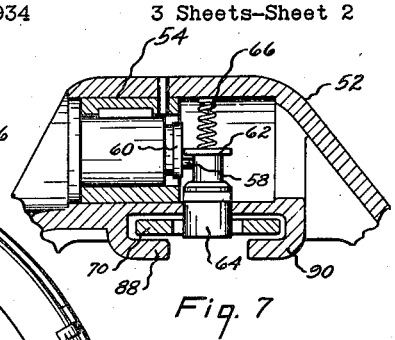
Figure 9:
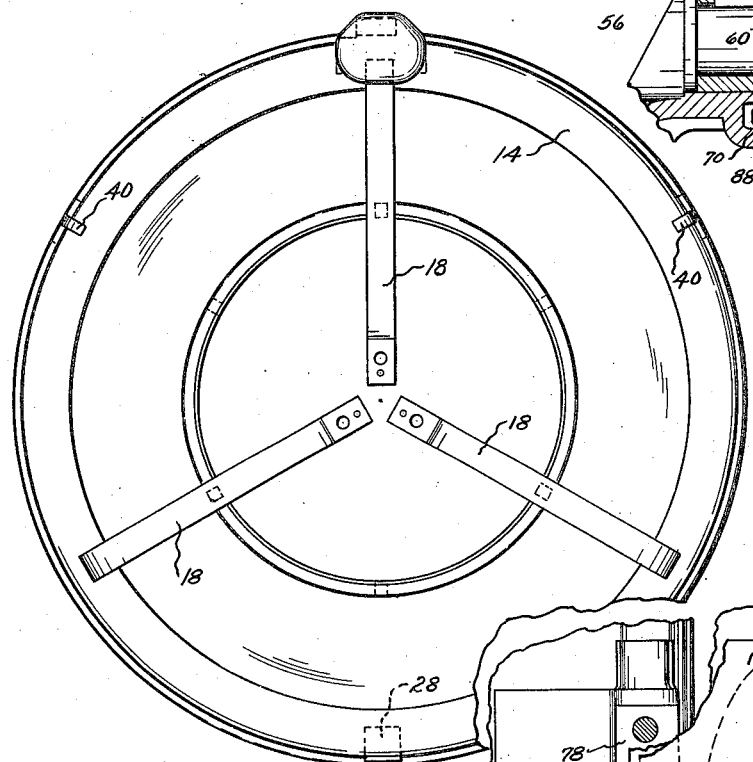
Figure 8:
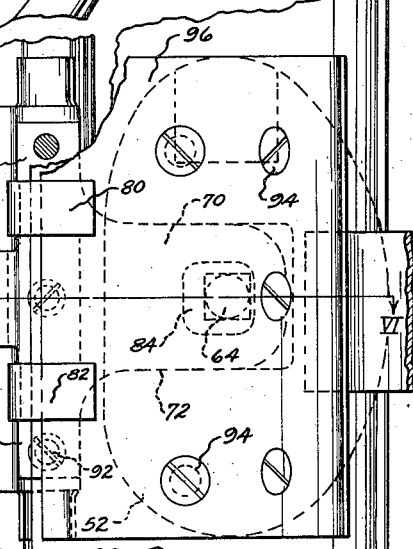
Figure 4:
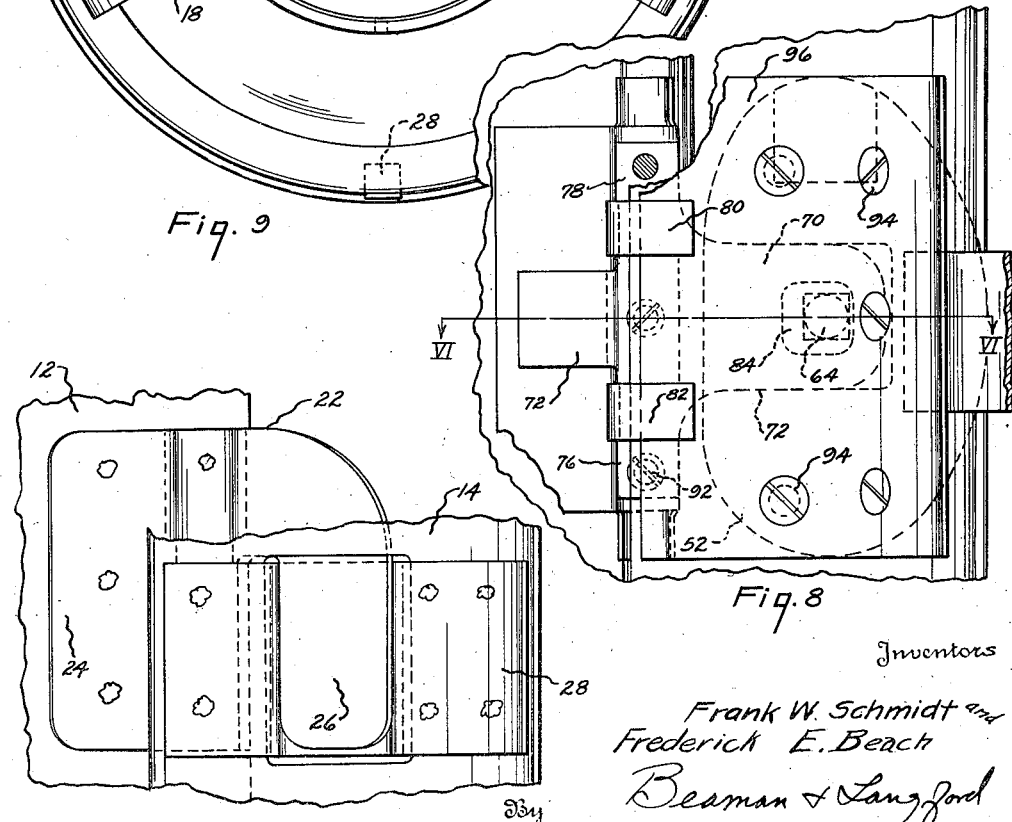

Fig. 1 is a section of one form of tire cover to which the present invention is adaptable; the spare tire and wheel and carrier therefor being shown in dotted line representation, Fig. 2 is an enlarged fragmental cross-sectional view of the upper part of Fig. 1 showing the latch bar reinforcement plate carried by one part of the cover, Fig. 3 is an enlarged fragmental sectional view of the lower part of Fig. 1 showing the engaging hook and slot latching structure carried by the cooperating parts of the cover, Fig. 4 is a fragmental plan view taken from the inside of the cover of the latching structure shown in section in Fig. 3, Fig. 5 is a side elevational view of the preferred form of latch structure employed to clamp a two-part tire cover upon the tire; the parts of the tire cover being shown in section, Fig. 6 is a view similar to Fig. 2 showing my improved tire cover lock structure applied to the cover shown in Fig. 1; the section through the lock structure and cover being taken on line VI—VI of Fig. 8, Fig. 7 is a sectional view of the cast housing of the lock structure taken on line VII—VII of Fig. 6, Fig. 8 is a fragmental plan view taken from the inside of the cover of the structure shown in section in Fig. 6, Fig. 9 is an elevational view taken from the back side of the tire cover removed from the spare wheel carrier and showing the lock structure carried by the back section of the cover and the relative positions of the latch structure shown in Figs. 3 and 5, Fig. 10 is a slightly modified form of the invention, and Fig. 11 is a view from the rear of the tire cover shown in Fig. 10 showing the relative positions of the latching and locking structures.

According to the present invention, lock structure is provided for multi-part tire covers which is independent of the spare wheel structure and equally adaptable to all forms and design of face plate cover section. From this it will become apparent that only the tire size need be considered in the design of the tire cover and all consideration of the wheel structure and associate parts may be omitted. In the preferred form of the invention, the lock structure and tire cover design is such that the cover may be sold as complete without the lock structure and the same may be applied as an accessory by the consumer. An outstanding feature of the lock and tire cover design according to the present invention resides in its ability to resist being distorted and sprung out of a locked state notwithstanding the relative light gauge sheet metal from which the body of the tire cover is fabricated.

Referring to the drawings, the invention is illustrated in Fig. 1 in connection with a tire cover 10 of the same general design as disclosed in my copending application Serial No. 584,030 filed December 31, 1931. The tire cover 10 consists of a ring shaped face plate 12 and back band 14 proportioned to telescope at the tread of the tire to enclose the tread and front side of the tire and at least a portion of the rear side of the tire. In the embodiment shown, the face plate 12 terminates in an annular ornamental molding 16 leaving the hub and center wheel structure exposed. It is to be understood, however, that the face may be solid enclosing the entire outer side of the tire and wheel structure as shown in Fig. 10 or be apertured in the locality of the hub to receive a removable closure to give access to the interior of the wheel hub. In fact, the solid face plate shown in Fig. 10 has the advantage of rendering inaccessible the wheel mounting structure for unauthorized removal of the wheel without the employment of locking structure in addition to that associated with the tire cover as will be hereinafter more fully disclosed.

For economical fabrication, the back band 14 is preferably rolled from strip stock and formed into a solid annulus. As more clearly shown in Figs. 1 and 9, the back band 14 has connected thereto spider members 18 for concentrically supporting the same from the wheel carrier 20 in any suitable manner. This arrangement facilitates the clamping of the two parts of the tire cover 10 upon the tire. The invention, however, is equally adaptable with the back band 14 unsuspended as shown in my copending application heretofore mentioned. Also, in lieu of the relatively narrow back band 14 and the spider member 18, a solid sheet metal back member may be employed to entirely enclose a portion of the tread and rear side of the tire and wheel as will be more fully disclosed with reference to the modification shown in Fig. 10.

The structure for clamping the face plate 12 and back band 14 upon the tire yet permitting the face plate 12 to be bodily removed at the time the spare wheel is demounted will now be described. Referring to Figs. 1, 3 and 4, in particular, a latching member 22 is attached to the face plate 12 in any suitable manner as by welding. This member is preferably of heavy gauge sheet metal and has a base 24 of considerable extent for attachment to the relatively light gauge metal of the face plate in order to distribute any stress, placed upon the member 22 by attempted unauthorized removal of the tire cover, to a fairly large area of the face plate. A hook 26 is integral with the body 24 and extends circumferentially of and is spaced from the outer edge of the face plate 12. For receiving the hook 26 to latch the face plate 12 and back band 14 together, a heavy gauge sheet metal plate 28 is attached to the inside of the back band 14 in any suitable manner, as by welding. This plate may also serve as a gusset plate to which the ends of the back band 14 are welded to form a solid annulus. A part of the plate 28 is deflected at 30 and extends through an opening 32 in the back band 14 to define a slot 34 with the outside of the back band 14. The hook 26 may be freely received in the slot 34 by slightly tilting the top of the face plate 12 outwardly and rotating the same slightly about its axis. When the face plate is urged into position, the hook will bind at 36 and 38 to give a snug anti-rattle connection. The hook 26 and slot 34 are preferably located to hold the parts of the cover in at the bottom, but this is optional. Also, more than one hook and slot latching connection between the parts of the tire cover may be found advantageous. With the parts latched at the bottom as just described, the same are preferably clamped upon the tire through expansible and contractible latches 40 spaced about the circumference of the back band 14. These latches resiliently clamp the parts of the tire cover 10 upon the tire in the manner set forth in my aforesaid application. As shown in Fig. 5, the latch 40 is detachably engaged to a hooked link member 42 connected to the face plate 12 through a resilient member 44.

As more clearly shown in Fig. 2, the face plate 12 is formed to provide a bead 46 at its outer edge which may be capped by an ornamental strip in the manner disclosed in my aforesaid copending application. For purposes to be more fully disclosed hereinafter, a heavy gauge sheet metal reinforcement plate 48 is attached to the inside of the face plate in any suitable manner, as by welding, being shaped to conform to the general contour of the bead 46. This plate is drilled and tapped at spaced points as at 48', and as shown, a metal insert 50 is employed within the bead to thicken up the stock to afford adequate support for screws to support the latch bar as will be described. As shown in Fig. 2, the back band is drilled or punched to provide holes 51 for the passage of screws for attaching the locking mechanism.

The tire cover as shown in Fig. 1 and described in the foregoing paragraphs is complete and ready for use, being in no way dependent in its proper application to the tire upon the function of the locking structure. The tire cover can be furnished the consumer in this form as shown in Fig. 1 and in the event the security of the locking structure is desired, the same may be readily applied as an accessory.

Referring to Figs. 6, 7 and 8, the lock structure comprises a cast housing 52 bored at 54 to receive a key operated lock cylinder 56 of well known construction. An eccentric latch actuation pin 58 is carried by a rotatable part 60 of the lock cylinder and engages a shoulder 62 of the latch 64 to raise the same against the stress of the spring 66. The housing 52, preferably conforms along the underside of the contour of the back band 14 except for a groove 68 which with the back band 14 defines a slot to receive the latch bar 70. As more clearly shown in Figs. 6 and 8, the latch bar 70 is preferably of relatively heavy gauge sheet metal with an outwardly extending part 72, an inwardly extended part 74, circumferentially extending parts 76 and 78, and reversely bent parts 80 and 82. The part 72 is apertured at 84 to loosely receive the latch 64 which is carried upwardly by the nose 86 of the latch bar 70 at the time the same is inserted into the slit defined by the groove 68. Preferably, the size and location of the aperture 84 is such as not to interfere with the clamping action of the face plate and back band 14 upon the tire by the latches 40. In other words, depending upon the tire size, the latch 64 will occupy different positions in the aperture 84.

To resist and prevent distortion of parts and springing of the latch and latch bar apart, it will be noted that the edge of the back band is confined by the portions 80 and 82 of the latch bar 70; the forward part 72 is confined within a channel in the casing defined by portions 88 and 90 obviating unlatching of the bar 70 and latch 64 by springing the back band from the housing 52; and the housing 52 is designed to substantially house the entire portion of the latch bar 70 extending beyond the edge of the face plate 12.

In the preferred form of the invention the latch bar 70 is attached to the reinforcement plate 48 by screws 92 and the casing 52 is attached to the back band 14 by screws 94 passing through a loose anchor plate 96 and the back band 14 and threadedly received in the housing 52. With this arrangement the tire cover may be manufactured and sold as shown in Figs. 1, 2 and 3 and the latch bar casing 52 and plate 96 can be readily applied with a screw driver as an accessory by the consumer.

Referring to the modification shown in Figs. 10 and 11, the face plate 98 is solid as well as the back band or plate 100 supported from the spare wheel carrier 102. For facilitating application and removal of the face plate 98, the latching member 104 and the lock structure 106 which correspond, respectively, to the structure shown in Figs. 4 and 6, are reversed from the position shown in Fig. 9. Latches of the type shown in Fig. 5 appear as 108 in Fig. 11. It should be apparent that the lock structure 106 in the cover shown in Fig. 10 not only acts to lock the face plate 98 against removal but also acts to lock the spare tire and wheel upon the carrier 102. As shown, nuts 108 are welded to the carrier 102 and stud bolts 110 are passed through apertures in the wheel hub and back plate 100 to secure the same to the carrier 102. Suitable means may be provided to hold the back plate 100 in position at the time the spare wheel is removed.

The application of the face plate to the back band or plate in the cover structure shown in Figs. 1 and 10 is thought to be obvious. In the cover shown in Fig. 3, with the top of the face plate slightly tilted, the hook 26 is inserted in the slot 34 by a sidewise or slight rotary movement of the face plate 12 relative to the back band 14. With the hook 26 fully received in the slot 34, the latch bar 70 will be in alignment with the groove 68 and upon urging the face plate and back band into telescoping relation, the latch bar 70 is engaged by the latch 64. It is to be understood that the two parts of the cover are clamped upon the tire by the expansible and contractible latch member 40 and the design of the latch bar 70 and latch 64 is such as not to interfere with the action of these members.

In the type of cover shown in Fig. 1 it will be appreciated that with the spider member 18, riveted, welded or otherwise fixedly secured to the spare wheel carrier or other fixed structure, that the application of the lock structure shown in Fig. 6, for example, will not only prevent the unauthorized removal of the tire cover, but the spare wheel will be also locked on by the tire cover against removal. This obviates the necessity of a locking hub cap or a lock applied to a nut or stud, securing the spare wheel to the carrier.

Having thus described our invention what we desire to secure by Letters Patent and claim is:

1. In combination with a fixed structure of a vehicle having a spare wheel and tire carried thereby, of a metallic tire cover having one part supported from said structure and enclosing at least a portion of the rear side wall of said tire, another part of said cover being bodily removable and enclosing the front side wall of said tire, latching members carried by said parts and engageable and disengageable with each other only upon relative movement of the parts in a plane substantially normal to the axis of said wheel, and additional latching members spaced about the circumference of one of said parts, said latching members being expansible and contractible in a direction substantially parallel with the axis of said wheel and engageable with the other of said parts to assemble the tire cover upon the tire.

2. In combination with a fixed structure of a vehicle and a spare wheel and tire carried by said structure, of a metallic tire cover having one part supported from said structure and enclosing at least a portion of the rear side wall of said tire, another part of said cover being bodily removable and enclosing the front side wall of said tire, latching members carried by said parts engageable and disengageable with each other only upon relative movement of said parts, and additional latching members spaced about the circumference of one of said parts, said latching members being expansible and contractible in a direction substantially parallel with the axis of said wheel and engageable with the other of said parts to assemble the tire cover upon the tire.

3. In combination with a fixed structure of a vehicle and a spare wheel and tire carried by said structure, of a metallic tire cover having one part supported from said structure and enclosing at least a portion of the rear side wall of said tire, another part of said cover being bodily removable and enclosing the front side wall of said tire, latching members carried by said parts engageable and disengageable with each other upon relative movement of said parts, additional latching members spaced about the circumference of one of said parts, said latching members being expansible and contractible in a direction substantially parallel with the axis of said wheel and engageable with the other of said parts to assemble the tire cover upon the tire, and locking means carried by said parts for locking opposed portions of said parts together and preventing disengaging movement of said first latching members.

4. In combination with a fixed structure of a vehicle and a spare wheel and tire carried by said structure, of means supporting said wheel from said structure, a metallic tire cover having one part supported from said structure, another part of said cover being bodily removable and coacting with said first part to enclose said tire, latching members carried by said parts and engageable and disengageable with each other only upon relative movement of said parts, and locking means carried by said parts for locking opposed portions thereof against relative movement, said locking means preventing disengaging movement of said latching members.

5. A metal tire cover comprising two separable tire enclosing parts fabricated from relatively light sheet metal stock, engaging latching members attached to opposed portions of said parts, said members being of relatively heavy metal stock and proportioned to distribute any stress applied against the same to a sizeable area of said parts, a reinforcement and attachment plate of relatively heavy metal stock attached to the underside of one of said parts adjacent an edge thereof, a latch bar carried by said plate and entering beyond said edge, a locking latch mechanism coacting with said lock bar located upon the outside of the other of said parts, an anchor plate located upon the inside of said last part, and means attaching said mechanism to said anchoring plate through said last part, said latch bar, latch mechanism and latching members acting to lock the cover upon the tire.

6. A metal tire cover comprising separable tire enclosing parts, a substantially rigid latch bar carried by one of said parts and projecting beyond an edge thereof, and a locking latch mechanism carried by the other of said parts with which said bar releasably engages to lock said part against separation, said latch bar extending into being substantially housed by said latch mechanism in locking position, whereby no part of said bar is exposed upon the outside surface of said cover parts and available for tampering.

7. A metal tire cover comprising separable tire enclosing parts, a latch bar attached to the inside of one of said parts and projecting beyond an edge thereof, and a locking latch mechanism attached to the outer side of the other of said parts with which said bar releasably engages to lock said parts against separation, said latch bar being substantially housed by said latch mechanism in locking position.

8. A metal tire cover comprising separable telescoping tire enclosing parts, a latch bar attached to the inside of the outer telescoping part and projecting beyond an edge thereof, and a locking latch mechanism attached to the outside of the inner telescoping part, said latch bar releasably engaging said mechanism and being substantially housed thereby in locking position.

9. A metal tire cover comprising separable parts having telescoping peripheral edge portions, locking mechanism for said portions including means attached to the inside of one of said portions and overlying the other of said portions, and key operative means attached to said other portion, overlying a part of said first means, and entering into locking engagement with the same.

10. A metal tire cover comprising separable parts having edge portions thereof contiguously located when applied to the tire, a rigid latch bar secured to one of said parts adjacent said edge, and a key operated latch structure secured to the other of said parts adjacent the edge thereof, said latch bar and latch being in engaging relation with said parts fitted to the tire, and means upon one cover part and engageable upon the other cover part preventing relative radial displacement of portions of said cover parts directly adjacent the locations of said bar and latch with the latter in engaging position.

11. A metal tire cover comprising separable parts of substantially the contour of the tire and adapted to closely fit the same, a rigid latch bar carried by one of said parts and having a portion overlying the other of said parts when said parts are fitted to the tire, a latch housing adapted to said other part, a key operated latch located in said housing and adapted to releasably engage said overlying portion of said latch bar, and means upon one cover part and engageable upon the other cover part preventing relative radial displacement of portions of said cover parts directly adjacent the locations of said bar and latch with the latter in engaging positions.

12. A metal tire cover comprising two parts divided circumferentially of the tire, a rigid latch bar attached to one of said parts and extending axially of the cover, and a key operated latch housing attached to the other of said parts and defining a slot for receiving said latch bar for locking said parts against separation, and means upon one cover part and engageable upon the other cover part preventing relative radial displacement of portions of said cover parts directly adjacent the locations of said bar and latch with the latter in engaging positions.

13. A metal tire cover comprising, two parts divided circumferentially of the tire and proportioned to closely conform to the tread and side walls of the tire mounted upon a spare wheel, latch members carried by said parts upon the outer circumference thereof, one of said members being freely engageable with one part, the other being angularly disposed to the other and in binding engagement when said parts are fitted upon the tire, and latching means spaced circumferentially about one of said parts with respect to said latch members and engageable with the other of said parts to clamp the cover upon the tire.

14. A metal tire cover comprising, two parts divided circumferentially of the tire and telescoping one with the other, separable resilient latching means for urging said parts into telescoping relation to clamp the same upon the sides of the tire, and lock structure carried by said parts for locking the same in telescoping relation against unauthorized separation, said lock structure permitting variations in the telescopic association of said parts, within the limits of tire size variations.

15. A metal tire cover comprising two telescoping parts divided circumferentially of the tire, separable means for clamping said parts upon the sides of the tire, and means carried by said parts for locking the same against separation, said second means being independent of said first means and locking said parts in varying degrees of telescopic association.

16. A metal tire cover comprising, two telescoping parts divided circumferentially of the tire, and separable means for clamping said parts on the sides of the tire, the amount of telescoping of said parts being dependent upon the size of the tire, said locking means carried by said parts adapted to lock the same against unauthorized separation with said parts in varying degrees of telescopic association.

17. A metal tire cover comprising two parts divided circumferentially of the tire, a latch bar attached to and partly housed by one of said parts and overlying and having a portion spaced from the other of said parts, and a locking latch mechanism attached to said other part and substantially housing that part of said bar overlying said other part, said mechanism including a key operated latch engageable with the spaced portion of said bar.

18. A metal tire cover comprising two telescoping parts divided circumferentially of the tire, means attached to the inside of the outer telescoping part adjacent the edge thereof, said means overlying the outside of the inner telescoping part and embracing the edge thereof to prevent deflection of said last part relative to said means, and key operative means attached to the outside of said last part releasably engaging said first means.

19. For a sheet metal tire cover having separable telescoping parts, locking latch means adapted to be applied to said cover as an accessory, said means comprising a latch bar adapted to be attached by screws to a reinforced portion of one of said parts upon the inside thereof, said bar when attached having a portion overlying the other of said parts, a housing adapted to be attached to said other part on the outside thereof by screws applied from the inside and anchoring in a reinforced part, and a key operated latch located with said housing engaging with said bar.

20. In combination with a fixed structure, a vehicle and a tire, a metallic tire cover having one part supported from said structure and enclosing at least a portion of the rear side wall of said tire, another part of said cover being bodily movable and enclosing the front side wall of said tire, latching members carried by said parts and engageable and disengageable with each other only upon relative bodily movement of the parts, and additional latching members spaced about the circumference of one of said parts, said last named latching members being expansible and contractible in a direction substantially parallel to the axis of said tire and engageable with the other of said parts to assemble the tire cover upon the tire.

21. A metal tire cover comprising two separable tire enclosing parts fabricated from relatively light sheet metal stock, engaging latching members attached to opposed portions of said parts, said members being of relatively heavy metal stock and proportioned to distribute any stress applied against the same to a sizeable area of said parts, a reinforcement and attachment plate of relatively heavy metal stock attached to the underside of one of said parts adjacent an edge thereof, a latch bar attached thereto, an anchoring plate secured to the inside of an opposed portion of the other of said parts, and a latch mechanism on the outside of said last named part overlying said anchoring plate.

FRANK W. SCHMIDT.
FREDERICK E. BEACH.